United States Patent [19]
Haar

[11] Patent Number: 4,505,114
[45] Date of Patent: Mar. 19, 1985

[54] POWER BOOSTER

[75] Inventor: Lucas H. Haar, Niddatal, Fed. Rep. of Germany

[73] Assignee: ITT Industries, Inc., New York, N.Y.

[21] Appl. No.: 515,731

[22] Filed: Jul. 21, 1983

Related U.S. Application Data

[63] Continuation of Ser. No. 238,869, Feb. 27, 1981, abandoned.

[30] Foreign Application Priority Data

Apr. 5, 1980 [DE] Fed. Rep. of Germany ....... 3013456

[51] Int. Cl.³ .............................................. B60T 13/20
[52] U.S. Cl. ..................................... 60/554; 60/547.1; 60/562; 91/369 A
[58] Field of Search ...................... 60/547 R, 552, 553, 60/554, 562; 91/369 A

[56] References Cited

U.S. PATENT DOCUMENTS

| | | | |
|---|---|---|---|
| 2,900,962 | 8/1959 | Ingres | 60/547 R |
| 2,929,215 | 3/1960 | Stelzer | 60/547 R |
| 2,929,216 | 3/1960 | Stelzer | 60/553 |
| 2,957,454 | 10/1960 | Stelzer | 60/551 |
| 3,132,567 | 5/1964 | Ingres | 91/369 A |
| 3,408,815 | 11/1968 | Stelzer | 60/553 |
| 3,564,849 | 2/1971 | Huruta | 60/553 |
| 4,354,353 | 10/1982 | Laue | 91/369 A |

FOREIGN PATENT DOCUMENTS

| | | | |
|---|---|---|---|
| 23585 | 10/1968 | Japan | 60/547 R |
| 22133 | 9/1969 | Japan | 60/547 R |
| 2070172 | 9/1981 | United Kingdom | 60/547 R |
| 2074268 | 10/1981 | United Kingdom | 60/547 R |

Primary Examiner—Abraham Hershkovitz
Attorney, Agent, or Firm—James B. Raden; Edward J. Brosius

[57] ABSTRACT

A pneumatic brake booster for a hydraulic brake system where a master cylinder is disposed between the splashboard of a vehicle and the booster housing. The booster acts on the master cylinder piston by means of a push rod and is controlled by an actuating rod extending from a brake pedal through the center of the master cylinder and the push rod to the booster control valve disposed in the booster housing. The booster housing is light weight, since it is loaded by only the pneumatic pressure.

18 Claims, 2 Drawing Figures

POWER BOOSTER

CROSS REFERENCE TO RELATED APPLICATION

This application is a continuation, of application of Ser. No. 238,869, filed Feb. 27, 1981, now abandoned.

BACKGROUND OF THE INVENTION

The present invention relates to a mechanically controllable power booster for actuation of a hydraulic master cylinder, in particular, for hydraulic brake systems of automotive vehicles, comprising a booster housing fastened to the open end of the housing of the master cylinder, a booster piston movable in the booster housing and subdividing the housing's interior into two chambers, namely a low pressure chamber and a working chamber, a valve device to control the pressure prevailing in the working chamber carried by the working piston and a reaction device which adds, upon actuation, the force of an actuating rod connected with the control element of the valve device to the force delivered by the booster piston in a predetermined ratio and transmitting the combined forces to a push rod actuating the master cylinder.

In a known power booster of this type, for example, German Pat. No. DE-OS 2,922,299, the actuating rod projects from the booster housing on the side thereof remote from the master cylinder and is pressed into the booster housing for actuation of the power booster. The booster housing is fastened to a mounting plate of the vehicle on the side of the actuating rod. For the purpose of relieving the load from the booster housing and reducing the weight of the power booster, there is provided a slotted tube axially penetrating the interior of the booster housing, which tube transmits the forces occurring between master cylinder and the housing's attachment at the vehicle. This known power booster entails considerable effort and cost and its effective working surface is reduced by the annular cross section of the tube.

There is another known power booster for a hydraulic brake system in automotive vehicles, for example, German Pat. No. DE-PS 543,640, in which the booster housing is secured to an open end of the master cylinder and the booster piston is via a push rod rigidly connected with a first piston of the master cylinder. The actuating rod projects from the bottom of the master cylinder remote from the booster and is connected to a second piston which is spaced from the first piston of the master cylinder. Located between the end of the actuating rod and the brake pedal is the valve device which communicates with a working chamber of the power booster via a hose line extending parallel to the master cylinder. A reaction device is not employed in this known power booster. A disadvantage of this known power booster is that its control is purely travel-responsive, permitting the driver to "feel" the magnitude of the brake force actually generated only indirectly through the vehicle deceleration and, as a result, there is the danger of over-braking the vehicle. Another disadvantage is that the actuating force applied at the brake pedal is not able to be utilized for the generation of a working pressure in the master cylinder in the case of an inoperable power booster.

In still another known power booster for hydraulic brake systems of automotive vehicles, for example, U.S. Pat. No. 2,900,962, the booster housing is arranged on the end of the master cylinder and the booster piston is connected to the piston of the master cylinder via a tube. Inside the tube, the actuating rod is arranged. The actuating rod penetrates the piston of the master cylinder and the tube and bears against the booster piston through a reaction device formed by levers. In this known power booster, the booster housing is loaded by solely those pressures which prevail in its inside. The pressure forces introduced at the actuating rod are absorbed directly by the housing of the master cylinder and supported at the housing's fastening to the vehicle. This known power booster has the disadvantage of being expensive to manufacture and of requiring the diameter of the master cylinder to be increased due to the arrangement of the actuating rod inside the tube so that part of the weight reduction which may be achieved by this structure will be consumed by the higher weight of the master cylinder.

SUMMARY OF THE INVENTION

It is an object of the present invention to provide a power booster of the type initially referred to which is of straightforward construction and of low weight.

A feature of the present invention is the provision of a power booster for a hydraulic brake system of an automotive vehicle comprising a booster having a booster housing fastened to one end of a housing of a master cylinder, a working piston movable within the booster housing and subdividing the booster housing into a low-pressure chamber and a working chamber, a valve device carried by the working piston to control the pressure in the working chamber, and a reaction device which, upon actuation of the booster, adds up the force of an actuating rod connected to a control element of the valve device to the force delivered by the working piston in a predetermined ratio and transmits the resultant force to a hollow push rod actuating the master cylinder; the actuating rod extending axially through the push rod and the master cylinder; and the other end of the master cylinder housing being secured to a mounting member of the vehicle.

A power booster is thereby obtained in which the forces introduced by the actuating rod are supported directly at the master cylinder and do not act on the booster housing. Therefore, the walls of the booster housing may be of a very thin construction which results in a considerable reduction in weight. The expansions of the booster housing occasioned by the working pressures are not a disadvantage, since they have no effect during the force transmission from the actuating rod to the piston of the master cylinder. Another advantage of the power booster in accordance with the present invention is offered by the actuating rod being only tensilely loaded. Therefore, the actuating rod may be of a very thin construction so that the dimensions of the master cylinder are changed to an immaterial degree only. The working surface of the power booster is reduced merely by the cross-sectional area of the push rod. This cross-sectional area generates a compressive force in the brake-releasing direction when the power booster is driven by low pressure in the release position of the booster and, thus, obviates the need for additional return springs to move the booster piston into the brake-releasing position. As a result, the efficiency of the power booster is not impaired by the compression of strong return springs.

In an advantageous embodiment of the present invention, the push rod is guided in the housing of the master cylinder and carries the booster piston at its end extending into the booster housing, the booster piston being supported on the push rod. Thus, a support of the booster piston in the booster housing may be dispensed with, thereby enabling a simple construction of the booster and a short axial overall length. Also, expansions of the booster housing under load have no influence on the guiding of the booster piston. In an advantageous structure, the push rod is formed integrally with the piston of the master cylinder. The push rod is at its end close to the booster provided preferably with a pressure plate abutting the reaction device and guiding the booster piston, which pressure plate is held with a cylindrical projection in the push rod bore. This offers the advantage that the push rod is permitted to be manufactured of a material with lower strength, for example, aluminum or die-casting zinc alloy, integral with the piston of the master cylinder, and the pressure plate is permitted to be manufactured of a material with higher strength, for example, steel.

The valve device of the power booster is preferably arranged on the side of the reaction device remote from the push rod in order to achieve maximum short force-transmission travels. In a favorable embodiment, the actuating rod extends through the pressure plate at the end of the push rod and through the reaction device and carries at its end the control element of the valve device. In this way, the control element is guided by the actuating rod, so that the guidance of the control element in the booster piston may be of short construction. To be in a position to utilize the effective surface of the booster piston to an optimum extent, the end wall of the booster housing opposite to the master cylinder is closed, and the valve device is connected via a flexible hose to a port for delivery of the working pressure in the booster housing.

In a favorable improvement of the present invention, the hub of the booster piston has an axial bore, which enlarges from a middle section to its ends in a stepped manner, into which axial bore the reaction device and the valve device are inserted from either end. This causes considerable simplification of construction and assembly of the power booster. Preferably, the section of the stepped bore forming the valve chamber is closed to the outside by a cover, with a rolling diaphragm being clamped between the cover and the end surface of the hub to seal a closure member of the valve device relative to the bore's wall. In this way, a fastening of the rolling diaphragm and a sealing of the cover is accomplished simultaneously.

The locking-in-position of the booster piston on the end portion of the push rod is advantageously effected by a compression spring which takes support on the control element and urges the booster piston against the reaction device. This has the advantage of the movement of the booster piston being resiliently absorbed when the brake is released, so that hard stop noises are avoided. A stop at the booster housing is not necessary so that the construction of the booster housing is not required to meet close manufacturing tolerances. In this arrangement, the control element bears advantageously via the actuating rod against a stop in the master cylinder. Arranged likewise advantageously between the stop in the master cylinder and the actuating rod is a compression spring which attenuates the stop movement of the actuating rod linkage.

In a preferred embodiment of the present invention, the floating piston of a tandem master cylinder, supported resiliently at the push rod piston, forms the stop for the actuating rod in the brake-releasing direction. The attenuation of the stop movement is hereby assisted by the floating piston. In addition to this, the actuating rod may be supported advantageously via a second stop in the brake-applying direction on the push rod piston and it may form the locking mechanism for a biased compression spring arranged between the floating piston and the push rod piston. This results in a simplification of the master cylinder of the power booster in accordance with the present invention.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENTS

Figure 1:
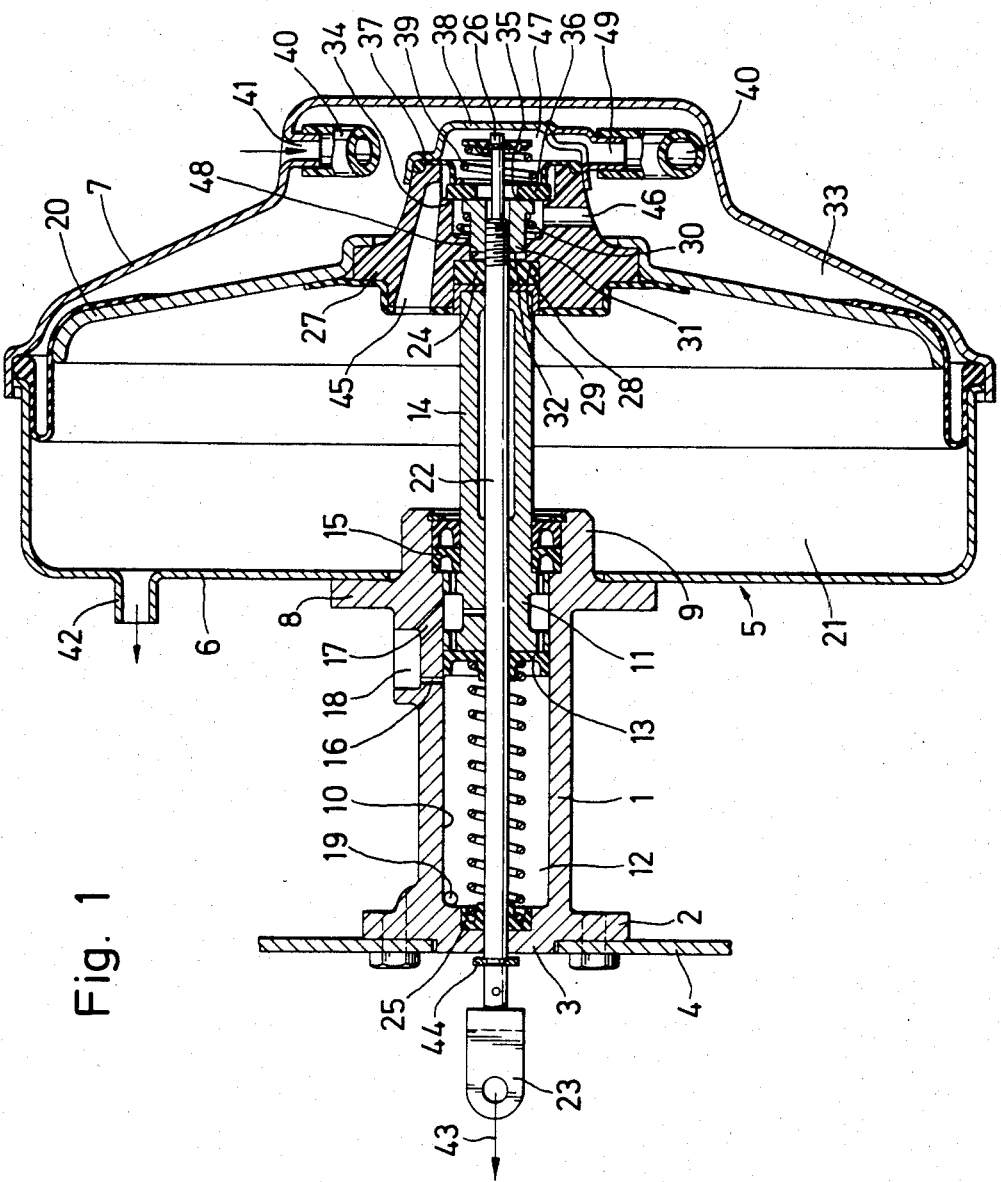
FIG. 1 is a longitudinal cross-sectional view of a power booster for a hydraulic brake system in accordance with the principles of the present invention.

The power booster illustrated in FIG. 1 includes a hydraulic master cylinder 1, which with a mounting flange 2 at its end 3 is bolted onto a splashboard 4 of an automotive vehicle isolating the engine space from the passenger cabin. Master cylinder 1 carries at its open end portion the booster housing 5 which includes the housing sections 6 and 7. Housing section 6 is secured to another flange 8 of master cylinder 1 and has a central opening in which the end 9 of master cylinder 1 is received.

Arranged in cylinder bore 10 is a piston 11 which is sealed relative to the pressure chamber 12 by means of a cup 13. One end portion of piston 11 forms a push rod 14 which extends from master cylinder 1 and carries at its end a booster piston 20. Seals 15 seal bore 10 relative to the low-pressure chamber 21 of the power booster. Cylinder bore 10 is connected via a compensating bore 16 and a supply bore 17 with a port 18 for a brake fluid reservoir. A connecting bore 19 leads from cylinder bore 10 to the lines of a hydraulic brake system.

For the actuation of the power booster, an actuating rod 22 is provided carrying at its one end portion a forkhead 23, to which a brake pedal is to be fastened. Actuating rod 22 penetrates bottom 3, cup 13, piston 11 and push rod 14 and extends with its end 26 beyond the end portion of push rod 14. Pressure chamber 12 is sealed relative to actuating rod 22 by means of a seal 25 in bottom 3 and by means of cup 13.

Arranged at the free end portion of push rod 14 is a rubber disc 24 forming the reaction device of the power booster. Inserted onto rubber disc 24 and the end portion of push rod 14 is hub 27 of the working piston 20 with a bore 28, which hub is formed by a separate housing and abuts with an annular end surface 29 at rubber disc 24. Hub 27 is in this mounting position held by a return spring 30 which bears against a collar of control element 31 which is screwed onto end 26 of actuating rod 22. Control element 31 is adjusted on actuating rod 22 such that its one end surface 32 is spaced from rubber disc 24 so that the valve passage for admission of working pressure to the working chamber 33 is allowed to be opened prior to end surface 32 abutting rubber disc 24. Control element 31 is with its circumferential surface guided in a bore 48 of hub 27.

On the side remote from push rod 14, hub 27 forms a double-stepped extension of the bore 48, the middle step of which forms a valve seat 34 of the valve device. In the illustrated position, a closure member 36 abuts both valve seats 34 and 35. Closure member 36 is sealed relative to hub 27 by means of a diaphragm 37 which is clamped with a sealing bead between hub 27 and a cover 38 closing the stepped bore to the outside. A valve spring 39 bears against end 26 and urges closure member 36 against valve seats 34 and 35. Cover 38 has a fitting 49 which communicates via a flexible hose 40 with a fitting 41 in booster housing 5. The power booster is connected to atmosphere via fitting 41. A further fitting 42 in housing section 6 connects low-pressure chamber 21 with a low-pressure source, for instance, to the intake manifold of an internal - combustion engine.

In the illustrated position, actuating rod 22 is displaced in the direction of arrow 43 by applying the brake pedal so far that closure member 36 abuts simultaneously both valve seats 34 and 35. Stop 44 at actuating rod 22 is placed in a distance from bottom 3 of the master cylinder which corresponds to the closure travel between closure member 36 and valve seat 34. In this position, low-pressure chamber 21 and working chamber 33, which were interconnected via the channels 45 and 46 in the inactivated position of the power booster, are separated from each other by closure member 36. However, the same pressure still prevails in both chambers. A further displacement of actuating rod 22 in direction of the arrow causes valve seat 35 to lift from closure member 36 so that air under atmospheric pressure flows from chamber 47 via channel 46 into working chamber 33 and causes an increase in pressure there. As a result, working piston 20 will displace likewise in the direction of arrow 43 while taking support via rubber disc 24 on push rod 14. By deformation of the rubber disc 24, there occurs at the same time a transmission of a force onto control element 31 in opposition to the actuating direction, which force has to be compensated for at forkhead 23 by a counteracting force exerted by the brake pedal, if the valve device is desired to remain in its actuating position. Thus, the counteracting force represents for the operator a measurement for the degree of actuation and for the pressure generated in the master cylinder. When releasing the brake pedal, the valve device will be urged into its off position by return spring 30, with end 26 getting in abutment with cover 38 for the time being. In this position of the valve device, closure member 36 rests exclusively on valve seat 35, so that low-pressure chamber 21 communicates with working chamber 33 passing by valve seat 34 and the supply of atmospheric air is interrupted. This enables the pressure in working chamber 33 to adapt to the pressure prevailing in low-pressure chamber 21 which results in a decrease of the force exerted on working piston 20. The pressure prevailing in master cylinder 1 and the force of the return spring located in master cylinder 1 will induce the operating unit including booster piston 20, piston 11 and actuating rod 22 to retreat to its rest position.

In the end position, piston 11 comes to rest at a stop in master cylinder 1 and actuating rod 22 comes to rest with stop 44 at bottom 3. The releasing movement of booster piston 20 is elastically absorbed by return spring 30 and borne likewise via actuating rod 22 against stop 44. The slowing down of booster piston 20 from its releasing movement is furthermore assisted in that upon compression of return spring 30 the valve device will for a short time be in a position in which the chambers 21 and 33 are isolated from one another so that the volume of air, locked temporarily in working chamber 33, assists the slowing-down effect of return spring 30. The preload of return spring 30 is, however, sufficient in any case to move booster piston 20 in the off position into abutment with rubber disc 24 free from play.

Figure 2:
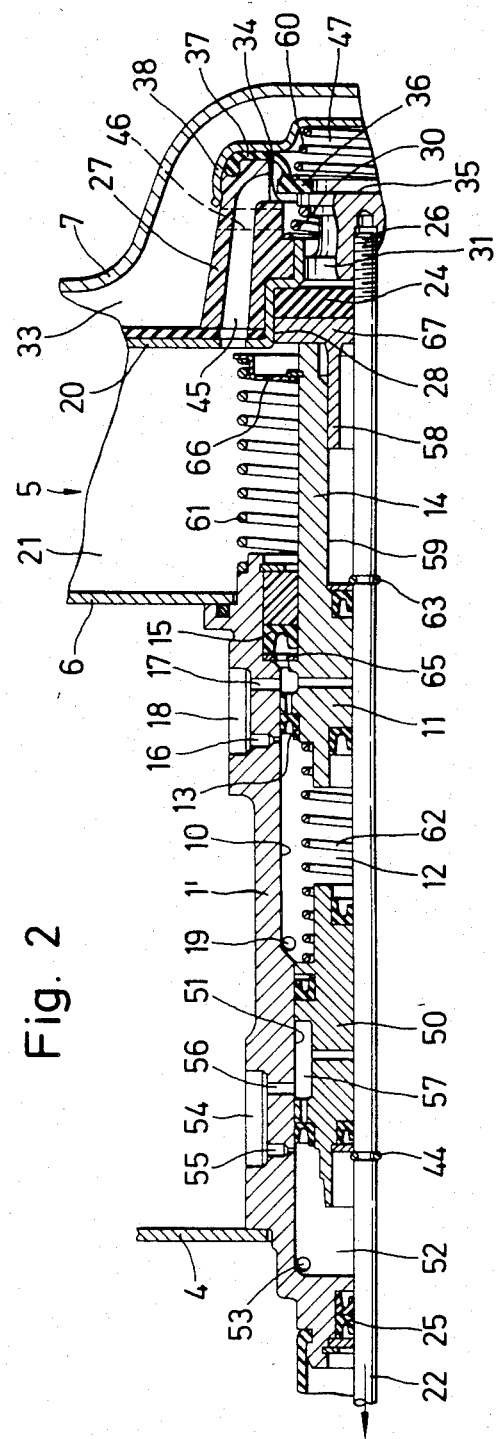
FIG. 2 is a partial longitudinal cross-sectional view of a power booster for a hydraulic dual-circuit brake system in accordance with the principles of the present invention.

In the embodiment illustrated in FIG. 2, parts of like function as those in the embodiment of FIG. 1 have been assigned like reference numerals. In the case of the power booster according to FIG. 2, master cylinder 1 is constructed as a tandem-type cylinder. The bottom of pressure chamber 12 is formed by a floating piston 50 which slides in a bore 51 adjoining cylinder bore 10 and which is sealed in a conventional manner relative to bore 51 and actuating rod 22 by means of cup-like sealing rings. Floating piston 50 defines a second pressure chamber 52 which communicates via a connecting bore 53 with a second brake circuit of a hydraulic brake system. A port 54 leads to a second chamber of a brake fluid reservoir and is via a compensating bore 55 connected to pressure chamber 52 and via a supply bore 56 to a compensating chamber 57 formed by floating piston 50.

Push rod 14 carries at its end a pressure plate 67, which has a cylindrical projection 58 secured in the enlarged bore section 59 in push rod 14. Pressure plate 67 is made of a material of greater strength than push rod 14 and provides a reliable guidance of booster piston 20. In contrast to the embodiment of FIG. 1, valve spring 60 bears against cover 38 and thus counteracts return spring 30 in the rest position of the power booster. Therefore, the force of return spring 30 is dimensioned greater than that of valve spring 60.

Master cylinder 1' includes two separate return springs 61 and 62. Return spring 61 is placed in low-pressure chamber 21 and bears via a spring plate 66 against push rod 14. Return spring 62 is arranged between piston 11 and floating piston 50 and is indirectly supported via the stops 44 and 63 on actuating rod 22. Both return springs 61 and 62 are biased, with the force of return spring 61 being greater than that of return spring 62. In FIG. 2, the power booster is shown when in its off position, in which low-pressure chamber 21 is connected to working chamber 33. The position of control element 31 is determined by stop 63 between actuating rod 22 and piston 11. Likewise, the position of valve seat 34 at working piston 20, which has to be lifted from closure mamber 36 in this position, is defined by abutment of the booster piston 20 on push rod 14 formed integrally with piston 11 by the intermediary of rubber disc 24. Due to this arrangement, only few manufacturing tolerances become cumulative which obviates the need for adjusting control element 31 after the assembly of the power booster. Since actuating rod 22 through its stop 63 is pressed against piston 11 by means of return spring 62, return spring 62 is required to be dimensioned such that its preload is of a greater amount than the preload of return spring 30.

In this embodiment, in the brake-releasing direction actuating rod 22 is held via floating piston 50, return spring 62 and piston 11 at piston stop 65 in master cylinder 1'. Therefore, the return movement of actuating rod 22 is attenuated by return spring 62. This attenuating effect assists the attenuating effect of return spring 30 described before.

While I have described above the principles of my invention in connection with specific apparatus, it is to be clearly understood that this description is made only by way of example and not as a limitation to the scope of my invention as set forth in the objects thereof and in the accompanying claims.

I claim:

1. A power booster for a hydraulic brake system of an automotive vehicle comprising:

a booster having a booster housing fastened to one end of a housing of a master cylinder, a working piston movable within said booster housing and sub-dividing said booster housing into a low-pressure chamber and a working chamber, a valve device carried by said working piston to control the pressure in said working chamber, and a reaction device which, upon actuation of said booster adds up the force of an actuating rod connected to a control element of said valve device to the force delivered by said working piston in a predetermined ratio and transmits the resultant force to a hollow push rod actuating said master cylinder;

said actuating rod extending coaxially through said push rod and said master cylinder housing to enable actuation of said control element from the other end of said master cylinder housing;

the other end of said master cylinder housing being secured to a mounting member of said vehicle; wherein one end of said push rod is guided in said master cylinder housing adjacent said one end thereof and the other end of said push rod supports said working piston thereon; wherein said push rod is integrally formed with a piston of said master cylinder and is disposed coaxially of a longitudinal axis of said master cylinder housing; and wherein said push rod carries a pressure plate on the end thereof adjacent said working piston, said pressure plate abutting said reaction device, guiding said working piston and having a cylindrical projection thereon engaging a bore in said push rod.

2. A power booster according to claim 1, wherein said valve device is disposed adjacent a side of said reaction device remote from said push rod.

3. A power booster according to claim 2, wherein said actuating rod carries said control element on an end thereof.

4. A power booster according to claim 3, wherein said booster housing has a closed end wall remote from said master cylinder, and said valve device is connected to a port in said closed end wall via a flexible hose for delivering working pressure to said valve device.

5. A power booster according to claim 4, wherein said working piston comprises a hub including a stepped axial bore having a first portion in the middle thereof with a first diameter, a second portion adjacent said push rod with a second diameter greater than said first diameter and a third portion remote from said push rod with a third diameter greater than said first diameter but different than said second diameter, said second portion carrying said reaction device and the adjacent end of said push rod, said first portion carrying said control element and said third portion providing a step as a valve set for said valve device.

6. A power booster according to claim 5, wherein said third portion provides a valve chamber which is closed by means of a cover, and further including a rolling diaphragm clamped between said cover and the adjacent end of said third portion to seal a closure member of said valve device relative to said third portion.

7. A power booster according to claim 6, further including a first compression spring supported by said control element to urge said working piston against said reaction device to retain said working piston in position on an adjacent end of said push rod.

8. A power booster according to claim 7, wherein said master cylinder is a tandem master cylinder having a floating piston resiliently related to said piston of said master cylinder, said floating piston providing a stop for said actuating rod in said brake-releasing direction.

9. A power booster according to claim 8, wherein said actuating rod contains a pair of spaced stops defining the position of said floating piston and providing and axial positioning mechanism for said second compression spring disposed between said piston of said master cylinder and said floating piston.

10. A power booster according to claim 1, wherein said actuating rod carries said control element on an end thereof.

11. A power booster according to claim 1, wherein said booster housing has a closed end wall remote from said master cylinder, and said valve device is connected to a port in said closed end wall via a flexible hose for delivering working pressure to said valve device.

12. A power booster according to claim 1, wherein said working piston comprises a hub including a stepped axial bore having a first portion in the middle thereof with a first diameter, a second portion adjacent said push rod with a second diameter greater than said first diameter and a third portion remote from said push rod with a third diameter greater than said first diameter but different than said second diameter, said second portion carrying said reaction device and the adjacent end of said push rod, said first portion carrying said control element and said third portion providing a step as a valve seat for said valve device.

13. A power booster according to claim 12, wherein said third portion provides a valve chamber which is closed by means of a cover, and further including a rolling diaphragm clamped between said cover and the adjacent end of said third portion to seal a closure member of said valve device relative to said third portion.

14. A power booster according to claim 1, further including a compression spring supported by said control element to urge said working piston against said reaction device to retain said working piston in position on an adjacent end of said push rod.

15. A power booster according to claim 1, wherein the positioning of said control element in a brake-engaging direction is determined by a first stop on said actuating rod bearing against said piston of said master cylinder.

16. A power booster according to claim 15, wherein said master cylinder is a tandem master cylinder having a floating piston resiliently related to said piston of said master cylinder, said floating piston bearing against a stop on said actuating rod when the rod is moved in said brake-releasing direction.

17. A power booster according to claim 1, wherein said master cylinder is a tandem master cylinder having a floating piston resiliently related to said piston of said master cylinder, said floating piston bearing against a first stop on said actuating when the rod is moved in said brake-releasing direction.

18. A power booster according to claim 17, wherein said actuating rod further includes a second stop spaced from said first stop, said first and second stops defining the position of said floating piston and providing an axial positioning mechanism for a compression spring disposed between said piston of said master cylinder and said floating piston.

* * * * *